(12) United States Patent
Mimar

(10) Patent No.: US 7,873,812 B1
(45) Date of Patent: Jan. 18, 2011

(54) METHOD AND SYSTEM FOR EFFICIENT MATRIX MULTIPLICATION IN A SIMD PROCESSOR ARCHITECTURE

(75) Inventor: Tibet Mimar, 1040 Gloucester Ct., Sunnyvale, CA (US) 94087

(73) Assignee: Tibet Mimar, Morgan Hill, CA (US)

( * ) Notice: Subject to any disclaimer, the term of this patent is extended or adjusted under 35 U.S.C. 154(b) by 782 days.

(21) Appl. No.: 10/819,059

(22) Filed: Apr. 5, 2004

(51) Int. Cl.
G06F 15/76 (2006.01)
(52) U.S. Cl. .................. 712/22; 712/2; 712/7
(58) Field of Classification Search ............ 712/22, 712/2, 4, 7, 9
See application file for complete search history.

(56) References Cited

U.S. PATENT DOCUMENTS

| | | | |
|---|---|---|---|
| 4,712,175 A * | 12/1987 | Torii et al. ............. 712/4 |
| 4,862,407 A * | 8/1989 | Fette et al. ............. 712/35 |
| 5,511,210 A | 4/1996 | Nishikawa et al. |
| 5,513,366 A * | 4/1996 | Agarwal et al. ............. 712/22 |
| 5,555,428 A | 9/1996 | Radigan et al. |
| 5,802,384 A | 9/1998 | Nakamura |
| 5,832,290 A | 11/1998 | Gostin et al. |
| 5,838,984 A | 11/1998 | Nguyen et al. |
| 5,864,703 A | 1/1999 | van Hook et al. |
| 5,872,987 A | 2/1999 | Wade et al. |
| 5,887,183 A * | 3/1999 | Agarwal et al. ............. 712/2 |
| 5,903,769 A | 5/1999 | Arya |
| 5,940,625 A | 8/1999 | Smith |
| 5,973,705 A | 10/1999 | Narayanaswami |
| 5,991,531 A * | 11/1999 | Song et al. ............. 703/26 |
| 5,991,865 A | 11/1999 | Longhenry et al. |
| 5,996,057 A | 11/1999 | Scales et al. |
| 6,058,465 A | 5/2000 | Nguyen |
| 6,530,015 B1 | 3/2003 | Wilson |
| 6,665,790 B1 | 12/2003 | Glossner, III et al. |
| 6,959,378 B2 | 10/2005 | Nickolls et al. |
| 6,963,341 B1 | 11/2005 | Mimar |
| 7,159,100 B2 | 1/2007 | Van Hook et al. |
| 7,191,317 B1 | 3/2007 | Wilson |
| 7,308,559 B2 | 12/2007 | Glossner et al. |
| 7,376,812 B1 | 5/2008 | Sanghavi et al. |
| 7,467,288 B2 | 12/2008 | Glossner et al. |
| 7,546,443 B2 | 6/2009 | Van Hook et al. |
| 2002/0198911 A1 * | 12/2002 | Blomgren et al. ............. 708/232 |
| 2003/0014457 A1 | 1/2003 | Desai et al. |
| 2005/0071411 A1 * | 3/2005 | Gustavson et al. ............. 708/514 |

OTHER PUBLICATIONS

Altivec Technology Programming Environment Manual, Altivecpem/D, Nov. 1998, Rev.0. www.altivec.com. See Permute Instruction.

(Continued)

*Primary Examiner*—Alford W Kindred
*Assistant Examiner*—Jesse R Moll

(57) ABSTRACT

The new system provides for efficient implementation of matrix multiplication in a SIMD processor. The new system provides ability to map any element of a source vector register to be paired with any element of a second source vector register for vector operations, and specifically vector multiply and vector-multiply-accumulate operations to implement a variety of matrix multiplications without the additional permute or data re-ordering instructions. Operations such as DCT and Color-space transformations for video processing could be very efficiently implemented using this system.

29 Claims, 15 Drawing Sheets

OTHER PUBLICATIONS

Imaging and Compression Engine (ICE), Silicon Graphics, http://futuretech.mirror.vuurwerk.net/ice.html.

Altivec Instruction Cross Reference: http://developer.apple.com/hardware/ve/instruction_crossref.html.

Intel SSE Instruction Set: http://www.tommesani.com/SSEPrimer.html.

"White Gaussian Noise Generator (Communication)", Reference Design Library, Xlinx System Generator v6.3 User Guide, 2004, 3 Pages.

Klimasauskas, Casimir C., "Not Knowing Your Random Number Generator Could Be Costly: Random Generators—Why Are They Important", PCAI (PC Artificial Intelligence), vol. 16.3, 2002, pp. 52-58.

Paar et al., "A Novel Predication Scheme for a SIMD System-on-Chip", 2002.

Anido et al., A Novel Method for Improving the Operation Autonomy of SIMD Processing Elements, 2002, IEEE.

"The Complete Guide to MMX Technology", Intel, McGraw-Hill, Inc.; ISBN 0-07-006192-0, 1997, pp. 2-21.

AltiVec Technology Programming Interface Manual, Freescale Semiconductor, Jun. 1999, Rev. 0.

Ian Mapleson, "O2 Architecture", Dec. 4, 2007.

"Intel 64 and IA-32 Architectures Software Developer's Manual", vol. 2B: Instruction Set Reference, N-Z, Dec. 2009, pp. 4-236 through 4-250.

"Power PC Microprocessor Family: Vector/SIMD Multimedia Extension Technology Programming Environments Manual", version 2.06, Aug. 22, 2005, pp. 244-249.

Donald E. Knuth, "The Art of Computer Programming", vol. 3, Sorting and Searching, Second Edition, 1998, Addison-Wesley, p. 221.

\* cited by examiner

VMUL    Vector Multiply (SIMD Processor)

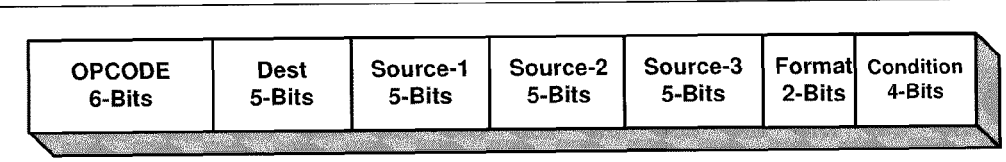

Format:

VMUL [.CC]    VRd, VRs-1, VRs-2
    VMUL [.CC]    VRd, VRs-1, VRs-2 [element]
    VMUL [.CC]    VRd, VRs-1, VRs-2, VRs-3

Description:
    Multiplies two vector registers and stores the result in vector-accumulate registers, as well as the saturated result is stored in a vector destination register.

Operation: N is the number of processor elements in SIMD processor.

```
for (i = 0; i < N; i++)
  {
    Case (Format)
       {
       Default_Mapping:        //Respective Element-To-Element Mode
         Map_Source_1 = i;
         Map_Source_2 = i;
         Mask = 0;
       One_Element_Broadcast:
         Map_Source_1 = i;
         Map_Source_2 = VRs-3 Opcode Field;
         Mask = 0;
       Any_Element_To_Any_Element_Mapping:
         Map_Source_1 = VRs-3[i]₅..₀;
         Map_Source_2 = VRs-3[i]₁₃..₈;
         Mask = VRs-3₁₅;
       }
    If (~Mask && VCF[i][Condition])
       {
         Paired_Source_1 = VRs-3[i]₆ ? 0: VRs-1[Map_Source_1];
         Paired_Source_2 = VRs-3[i]₁₄? 0: VRs-2[Map_Source_2];

VACC[i] ← (Paired_Source_1 * Paired_Source_2)₃₁..₀;
         VRd[i] ← Signed-Clamp (VACC[i]);
       }
  }
```

Figure 6

VMAC     Vector Multiply-Accumulate (SIMD Processor)

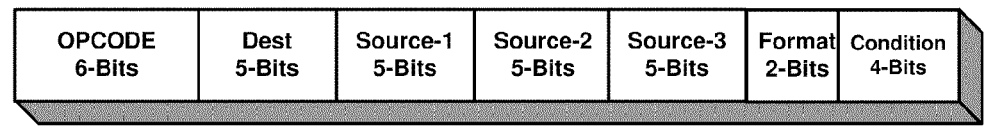

Format:
    VMAC [.CC]    VRd, VRs-1, VRs-2
    VMAC [.CC]    VRd, VRs-1, VRs-2 [element]
    VMAC [.CC]    VRd, VRs-1, VRs-2, VRs-3

Description:
    Multiplies two vector registers and accumulates the sign-extended result in vector-accumulate registers, as well as the saturated result is stored in a vector destination register.

Operation: N is the number of processor elements in SIMD processor.

```
for (i = 0; i < N; i++)
{
    Case (Format)
    {
        Default_Mapping:        //Respective Element-To-Element Mode
          Map_Source_1 = i;
          Map_Source_2 = i;
          Mask = 0;
        One_Element_Broadcast:
          Map_Source_1 = i;
          Map_Source_2 = VRs-3 Opcode Field;
          Mask = 0;
        Any_Element_To_Any_Element_Mapping:
          Map_Source_1 = VRs-3[i]5..0;
          Map_Source_2 = VRs-3[i]13..8;
          Mask = VRs-3 15;
    }
    If (~Mask && VCF[i][Condition])
    {
        Paired_Source_1 = VRs-3[i]6 ? 0: VRs-1[Map_Source_1];
        Paired_Source_2 = VRs-3[i]14? 0: VRs-2[Map_Source_2];

VACC[i] ← VACC[i] + (Paired_Source_1 * Paired_Source_2])31..0;
        VRd[i] ← Signed-Clamp (VACC[i]);
    }
}
```

Figure 7

$$\begin{bmatrix} Q0 \\ Q1 \\ Q2 \\ Q3 \end{bmatrix} = \begin{bmatrix} M0 & M4 & M8 & M12 \\ M1 & M5 & M9 & M13 \\ M2 & M6 & M10 & M14 \\ M3 & M7 & M11 & M15 \end{bmatrix} \begin{bmatrix} I0 \\ I1 \\ I2 \\ I3 \end{bmatrix}$$

Figure 8

| Output | Step # 1 | Step # 2 | Step # 3 | Step # 4 |
|--------|----------|----------|----------|----------|
| Q0 | M0 * I0 | + (M4 * I1) | + (M8 * I2) | + (M12 * I3) |
| Q1 | M1 * I0 | + (M5 * I1) | + (M9 * I2) | + (M13 * I3) |
| Q2 | M2 * I0 | + (M6 * I1) | + (M10 * I2) | + (M14 * I3) |
| Q3 | M3 * I0 | + (M7 * I1) | + (M11 * I2) | + (M15 * I3) |

Table: Multiplication of 4 x 4 Matrix with a 4 x 1 Matrix.

Figure 9

$$\begin{bmatrix} Q0 & Q4 \\ Q1 & Q5 \\ Q2 & Q6 \\ Q3 & Q7 \end{bmatrix} = \begin{bmatrix} M0 & M4 & M8 & M12 \\ M1 & M5 & M9 & M13 \\ M2 & M6 & M10 & M14 \\ M3 & M7 & M11 & M15 \end{bmatrix} \begin{bmatrix} I0 & I4 \\ I1 & I5 \\ I2 & I6 \\ I3 & I7 \end{bmatrix}$$

| Output | Step # 1 | Step # 2 | Step # 3 | Step # 4 |
|---|---|---|---|---|
| Q0 | M0 * I0 | + (M4 * I1) | + (M8 * I2) | + (M12 * I3) |
| Q1 | M1 * I0 | + (M5 * I1) | + (M9 * I2) | + (M13 * I3) |
| Q2 | M2 * I0 | + (M6 * I1) | + (M10 * I2) | + (M14 * I3) |
| Q3 | M3 * I0 | + (M7 * I1) | + (M11 * I2) | + (M15 * I3) |
| Q4 | M0 * I4 | + (M4 * I5) | + (M8 * I6) | + (M12 * I7) |
| Q5 | M1 * I4 | + (M5 * I5) | + (M9 * I6) | + (M13 * I7) |
| Q6 | M2 * I4 | + (M6 * I5) | + (M10 * I6) | + (M14 * I7) |
| Q7 | M3 * I4 | + (M7 * I5) | + (M11 * I6) | + (M15 * I7) |

Figure 10

$$A = \begin{bmatrix} a_{1,1} & a_{1,2} & \ldots & a_{1,n} \\ a_{2,1} & a_{2,2} & \ldots & a_{2,n} \\ \vdots & \vdots & & \vdots \\ a_{m,1} & a_{m,2} & \ldots & a_{m,n} \end{bmatrix} \quad B = \begin{bmatrix} b_{1,1} & b_{1,2} & \ldots & b_{1,p} \\ b_{2,1} & b_{2,2} & \ldots & b_{2,p} \\ \vdots & \vdots & & \vdots \\ b_{n,1} & b_{n,2} & \ldots & b_{n,p} \end{bmatrix}$$

1110     1120

$$A \cdot B = \begin{bmatrix} A_1 & A_2 & \ldots & A_n \end{bmatrix} \begin{bmatrix} B_1 \\ B_2 \\ \vdots \\ B_n \end{bmatrix} = A_1 \cdot B_1 + A_2 \cdot B_2 + \ldots + A_n \cdot B_n$$

1130 1131   1132    1160 / 1161 / 1162    1170   1171   1172

$$A_x \cdot B_x = \begin{bmatrix} a_1 \\ a_2 \\ \vdots \\ a_m \end{bmatrix} \begin{bmatrix} b_1 & b_2 & \ldots & b_p \end{bmatrix} = \begin{bmatrix} a_1 b_1 & a_1 b_2 & \ldots & a_1 b_p \\ a_2 b_1 & a_2 b_2 & \ldots & a_2 b_p \\ \vdots & \vdots & \ldots & \vdots \\ a_m b_1 & a_m b_2 & \ldots & a_m b_p \end{bmatrix}$$

1180

EXAMPLE:

$$\begin{bmatrix} 1 & 2 & 3 \\ 4 & 5 & 6 \\ 7 & 8 & 9 \end{bmatrix} \begin{bmatrix} a & d \\ b & e \\ c & f \end{bmatrix} = \begin{bmatrix} 1a & 1d \\ 4a & 4d \\ 7a & 7d \end{bmatrix} + \begin{bmatrix} 2b & 2e \\ 5b & 5e \\ 8b & 8e \end{bmatrix} + \begin{bmatrix} 3c & 3f \\ 6c & 6f \\ 9c & 9f \end{bmatrix}$$

Figure 11

$$\begin{bmatrix} Q0 & Q1 & Q2 & Q3 \\ Q4 & Q5 & Q6 & Q7 \\ Q8 & Q9 & Q10 & Q11 \\ Q12 & Q13 & Q14 & Q15 \end{bmatrix} = \begin{bmatrix} X0 & X1 & X2 & X3 \\ X4 & X5 & X6 & X7 \\ X8 & X9 & X10 & X11 \\ X12 & X13 & X14 & X15 \end{bmatrix} \begin{bmatrix} B0 & B1 & B2 & B3 \\ B4 & B5 & B6 & B7 \\ B8 & B9 & B10 & B11 \\ B12 & B13 & B14 & B15 \end{bmatrix}$$

| Output | Step # 1 | Step # 2 | Step # 3 | Step # 4 |
|---|---|---|---|---|
| Q0 | X0 * B0 | + (X1 * B4) | + (X2 * B8) | + (X3 * B12) |
| Q1 | X0 * B1 | + (X1 * B5) | + (X2 * B9) | + (X3 * B13) |
| Q2 | X0 * B2 | + (X1 * B6) | + (X2 * B10) | + (X3 * B14) |
| Q3 | X0 * B3 | + (X1 * B7) | + (X2 * B11) | + (X3 * B15) |
| Q4 | X4 * B0 | + (X5 * B4) | + (X6 * B8) | + (X7 * B12) |
| Q5 | X4 * B1 | + (X5 * B5) | + (X6 * B9) | + (X7 * B13) |
| Q6 | X4 * B2 | + (X5 * B6) | + (X6 * B10) | + (X7 * B14) |
| Q7 | X4 * B3 | + (X5 * B7) | + (X6 * B11) | + (X7 * B15) |
| Q8 | X8 * B0 | + (X9 * B4) | + (X10 * B8) | + (X11 * B12) |
| Q9 | X8 * B1 | + (X9 * B5) | + (X10 * B9) | + (X11 * B13) |
| Q10 | X8 * B2 | + (X9 * B6) | + (X10 * B10) | + (X11 * B14) |
| Q11 | X8 * B3 | + (X9 * B7) | + (X10 * B11) | + (X11 * B15) |
| Q12 | X12 * B0 | + (X13 * B4) | + (X14 * B8) | + (X15 * B12) |
| Q13 | X12 * B1 | + (X13 * B5) | + (X14 * B9) | + (X15 * B13) |
| Q14 | X12 * B2 | + (X13 * B6) | + (X14 * B10) | + (X15 * B14) |
| Q15 | X12 * B3 | + (X13 * B7) | + (X14 * B11) | + (X15 * B15) |

Table: Matrix Multiplication Sequence and Mapping of Elements in a SIMD.

Figure 12

| Format (From Opcode) | Instruction Syntax | Mode |
|---|---|---|
| Respective Elements | <Vector Inst>.<CC>  VRd, VRs-1, VRs-2 | Standard |
| | < Vector Inst >.<CC>  VRd, VRs-1, VRAs-2 | Standard w/Alternate |
| Element "K" Broadcast (Source-2 Only) | < Vector Inst >.<CC>  VRd, VRs-1, VRs-2[element] | Broadcast Mode |
| Any-Element to Any-Element Mapping | < Vector Inst >.<CC>    VRd, VRs-1, VRs-2, VRs-3 | Full Mapping |
| Table: Vector Instruction Format Groups. | | |

Figure 13

METHOD AND SYSTEM FOR EFFICIENT MATRIX MULTIPLICATION IN A SIMD PROCESSOR ARCHITECTURE

CROSS-REFERENCE TO RELATED APPLICATIONS

This application is related to co-pending U.S. patent application Ser. No. 10/357,805, filed on Feb. 3, 2003 by Tibet Mimar entitled "Flexible Vector Modes of Operation", and to co-pending U.S. patent application Ser. No. 10/441,336, filed on May 20, 2003 by Tibet Mimar entitled "Method For Efficient Handling Of Vector High-Level Language Conditional Constructs In A SIMD Processor".

BACKGROUND OF THE INVENTION

1. Field of the Invention

The invention relates generally to the field of processor chips and specifically to the field of Single-Instruction Multiple-Data (SIMD) processors. More particularly, the present invention relates to matrix operations in a SIMD processing system.

2. Background

Matrix multiplication operations are used often in many digital signal-processing operations, because linear operations could be expressed as matrix operations. For example, 4×4 transformation matrix is used to perform any color space to another color space transformation. The four-color components could be Red, Green, Blue, and Alpha, or any three-color component types and an Alpha channel typically used for keying applications. Color space transformation is used often in video, image and graphics applications. Another application of the matrix multiplication is in the implementation of Discrete Cosine Transform (DCT) for H.264 video compression standard (also known as AVC and MPEG-4 Part 10), which requires multiplication of multiple 4×4 matrices.

Existing SIMD processor architectures try to use SIMD instructions to speed up the implementation of these matrix operations by parallelizing multiple operations. SIMD instructions work on vectors consisting of multiple elements at the same time. An 8-wide SIMD could operate on eight 16-bit elements concurrently, for example. Even though SIMD architecture and instructions could be very efficient in implementing Finite Impulse Response (FIR) filters and other operations, the implementation of matrix operations are not efficient because matrix operations require cross mapping of vector elements for arithmetic operations. SIMD processors that are on the market at the time of this writing work with intra vector elements, which mean one-to-one fixed mapping of vector elements are used for vector operations. For example, when we use vector-add instruction, this instruction adds element-0 of source-1 vector register to element-0 of source-2 vector register and stores it to element-0 of output vector register; adds element-1 of source-1 to element-1 of source-2 and stores it to element-1 of output vector register, and so forth. In contrast, inter-mapping of source vector elements refers to any cross mapping of vector elements. Most SIMD processors provide little or no support for inter-element arithmetic operations. Motorola's AltiVec provides only two inter element vector instruction for arithmetic operations: sum of products and sum across (vector sum of elements). The other SIMD processors, such as MMX/SSE from Intel, or ICE from SGI does not even provide support for inter element operations other than vector sum operations. Silicon Graphics' ICE provides a broadcast mode, whereby one selected element of a source vector could operate across all elements of a second vector register. Intra element operation and broadcast modes of SIMD operation of prior art are shown in FIG. 1.

Some processors like the AltiVec provides a non-arithmetic vector permute instructions, whereby vector elements could be permuted prior to arithmetic operations. However, this requires two vector-permute instructions followed by the vector arithmetic instruction, which reduces the efficiency significantly for core operations such as DCT or color space conversion. It is conceivable that a SIMD processor has multiple vector units, where two vector permute units and vector arithmetic unit could operate concurrently in a super scalar processor executing two or more vector instructions in a pipelined fashioned. However, this requires the results of one instruction to be immediately available to the other unit by bypassing of intermediate vector results before these are written to the vector register file. Such bypassing of intermediate results becomes increasingly costly in terms of die area or number of gates, as the number of SIMD elements is increased over eight elements or 128-bit wide data paths.

The following describes how the above two example applications are handled by prior art.

Color Space Conversion

A transformation between color spaces requires multiplication of a 4×4 matrix with 4×1 input color matrix, as shown below converting input vector {I0, I1, I2, I3} to output vector of {Q3, Q2, Q1, Q0}, as shown in FIG. 8. The values of 4×4 matrix, M0 to M15, depend on the color space conversion being performed and consist of constant values. First, let us assume we have a 4-wide SIMD processor, and we are trying to calculate this matrix. First, we could pre-arrange the constant values of 4×4 matrix so that values are in column sequential, as we have done in this example. One could implement the matrix operations in two different ways. The classic approach is to multiply the first row of matrix with the first column of second matrix (only one in this case) and vector sum the results to obtain the first value. Similarly, second value is obtained by multiplying second row of 4×4 with the input vector and vector-summing the intermediate results. The second approach, that is more appropriate for SIMD implementation, is to calculate the partial sums of four output values at the same time. In other words, we would first multiply I0 with all the values of the first column of 4×4 matrix and store this vector of four values in a vector accumulator register. Next, we would multiply I1 with all the second column values of 4×4 matrix, and add this vector of four values to the vector accumulator values, and so forth for the remaining two columns of 4×4 matrix. This partial-product approach minimizes inter-element operations, and avoids the use of vector-sum operations. Column sequential ordering of 4×4 matrix allows us to load vectors of {m0, m1, m2, m3}, {m4, m5, m6, m7}, and others as vector load of sequential data elements into a vector register without the need to re-shuffle them. The arithmetic operations to be performed are shown in the table shown in FIG. 9

A 4-wide SIMD could calculate such matrix operations very efficiently, assuming there is a broadcast mode where one element could operate across all other elements of a second vector. A somewhat less efficient approach used by SIMD processors is to first use a "splat" instruction, which operates to copy any element from one vector register into all elements of another register. This would reduce the performance by 50 percent in comparison to a SIMD with broadcast mode, since all multiply or multiply-accumulate operations has to be proceeded by a splat vector instruction. MMX from Intel does not have such an instruction, and therefore, it takes four instructions, whereas SSE from Intel has a packed-shuffle instruction, which could implement the splat operation. In summary, other than 50 percent performance reduction due to splat operation, 4-wide SIMD processors could perform matrix operations about twice as fast as their scalar counter parts. But, the performance of these processors are not close to meeting high performance requirements of video, graphics, and other digital signal processing applications, because their level of parallelism is small due to small number of parallel processing elements. Furthermore, AltiVec and Pentium class processors do not meet the low cost and low power requirements of embedded consumer applications.

Let us look at an 8-wide SIMD to exemplify what happens when SIMD processor has higher potential "data crunching" power. In this case, we could process two input pixels at the same time, i.e., we would load eight values {I0, I1, I2, I3, I4, I5, I6, I7} where I0-3 is color components of the a pixel and I4-7 is the color components of adjacent pixel. In this case, we could preconfigure 4×4 matrix columns as {m0, m1, m2, m3, m0, m1, m2, m3} and so forth, and prestore these in memory so that we could access any column as a vector of eight values by a single vector load instruction. This is equivalent to multiplying the same 4×4 matrix with an input matrix of 4×2, resulting in a 4×2 matrix. FIG. 10 illustrates the operations in four steps of partial-product accumulation. The problem is, however, how we form a vector of {I0, I0, I0, I0, I4, I4, I4, I4} from input vector of {I0, I1, I2, I3, I4, I5, I6, I7}. Intel's MMX and SSE do not offer any direct help to resolve this, not to mention they are also 4-wide SIMD. Motorola's AltiVec Vector permute instruction could be used, but again this reduces performance by 50 percent, because during the permute step arithmetic unit remains idle, or we face complicated and costly bypassing of intermediate variables between concurrent vector computational units.

As shown in FIG. 11, multiplying matrix A 1110 and matrix B 1120 may be calculated by first decomposing matrix A to its columns, and matrix B to its rows, and performing a series of matrix multiplication of columns of A with respective rows of B and summing the partial results. The columns of matrix A 1110 is shown by A1 1130, A2 1131, and An 1132. Similarly, rows of B 1120 are decomposed as B1 1160, B2 1161, and Bn 1162. Then, matrix multiplication of A and B matrices could be expressed summation of A1·B1 1170, A2·132 1171, and An·Bn 1172, where symbol "·" denotes matrix multiplication. Matrix multiplication of a column matrix of Ax with a row matrix Bx, where "x" denotes column or row number before decomposition, generates an m-by-p matrix 1180. For above example of 4-by-4 A matrix 1110 and 4-by-2 B matrix, output matrix has 8 elements. Calculating 8 of these parallel will require an 8-wide SIMD, which could iterate over four columns to calculate the result in four clock cycles. However, such a calculation is not possible with that efficiency because pairing of input vectors requires the following mapping of input vectors:

{1, 2, . . . 4, 1, 2, . . . , 4} and {1, 1, . . . , 1, 2, 2, . . . , 2}. The requirement for mapping is further compounded for wider SIMD architectures and for larger input matrices.

DCT Calculation

H.264 video compression standard frequently uses a DCT based transform for 4×4 blocks in residual data. This transformation requires the calculation of the following operation:

Y=A·X·B where A and B are constant 4×4 matrices and X is the input as a 4×4 data matrix. We could first calculate A·X or X·B, because this is a linear operation. Since X matrix is the input data, it is typically in row-sequential order. This means the mapping of elements required for multiplication or multiply-accumulation cannot be pre-arranged, as in the previous example, and requires a cross mapping of inter elements. Let us take the case of Q=X·B, and let us assume that all input and output matrices are stored in row-sequential order.

This matrix multiplication could be done in four steps, as illustrated in FIG. 12, using the multiply accumulate feature of a SIMD processor to accumulate partial results. The first step is a multiply operation of two vectors:

{X0, X0, X0, X0, X4, X4, X4, X8, X8, X8, X8, X12, X12, X12, X12} and

{B0, B1, B2, B3, B0, B1, B2, B3, B0, B1, B2, B3, B0, B1, B2, B3}.

This step would require a single vector-multiple instruction, if we had the input vectors mapped as required, but this mapping would require two additional vector-permute instructions. The second step is a vector multiply-accumulate operation of the following two vectors:

{X1, X1, X1, X1, X5, X5, X5, X5, X9, X9, X9, X9, X13, X13, X13, X13} and

{B4, B5, B6, B7, B4, B5, B6, B7, B4, B5, B6, B7, B4, B5, B6, B7}

This step could also be done with a single vector-multiply accumulate instruction, if we had the input matrix elements already mapped as follows. To get this mapping, the prior art such as AltiVec from Motorola requires two additional vector-permute instructions.

The requirement of two additional vector permute instructions reduces the performance to about one third, because the duty cycle of arithmetic operations where vector arithmetic unit is used is one-third. A super scalar implementation would require two concurrent vector permute units, in parallel with the vector arithmetic unit, which also would complicate the intermediate bypassing due to wide data widths, for example for a 32-wide SIMD using a 512-bits wide data path. A scalar processor typically bypasses results so that result of one instruction becomes immediately useable by the following instruction. Even though each instruction takes several cycles to execute in a pipeline fashion, such as Instruction Read, Instruction-Decode/Register Read, Execute-1, Execute-2 and Write-Back stages in a five stage pipelined RISC processor, this becomes costly with regard to gate count in a wide data path processor such as SIMD. That is why SIMD processors and some VLIW processors from Texas Instruments (TMS3206000 series) do not employ bypass, and it is left to the user to put enough instruction padding, by the use of interleaving instructions or NOPs, to take care of this.

SUMMARY OF THE INVENTION

The present invention provides a method by which any element of a source-1 vector register may operate in combination with any element of a source-2 vector register. This provides the ultimate flexibility in pairing vector elements as inputs to each of the arithmetic or logical operation units of a vector processor, such as a SIMD processor. This flexible mapping of any inter element support provides support to implement matrix multiplications very efficiently. A 4×4 matrix multiplication requires only one vector multiply and three vector multiply-accumulate instructions in a 16-wide embodiment. H.264 requires multiplication of two 4×4 matrices for DCT transform, which could be implemented using a total of only eight vector arithmetic instructions, as opposed to the 24 vector instructions of prior art. The mapping of input elements is controlled by a third vector source register, wherein certain bit-fields within each element of the control vector register select the source mapping for both source vectors.

BRIEF DESCRIPTION OF THE DRAWINGS

The accompanying drawings, which are incorporated and form a part of this specification, illustrate prior art and embodiments of the invention, and together with the description, serve to explain the principles of the invention:

Prior Art

FIG. 6 shows the details of Vector-Multiply instruction of the preferred embodiment.

FIG. 7 shows the details of Vector-Multiply-Accumulate instruction of the preferred embodiment.

FIG. 8 shows matrix multiplication required for the general case of color space conversion.

FIG. 9 shows implementation of multiplication of 4×4 matrix with a 4×1 matrix.

FIG. 10 shows performing two matrix multiplications at the same time in four steps or multiplication of 4×4 matrix with a 4×2 matrix.

FIG. 11 shows decomposition of m-by-n matrix and n-by-p matrix into n column matrices and n row matrices, and matrix multiplication of respective column matrices with row matrices.

FIG. 12 shows mapping requirements of multiplication of 4×4 matrix with another 4×4 matrix implementation in a 16-wide SIMD processor.

FIG. 13 shows possible instruction formats of one embodiment of present invention.

DETAILED DESCRIPTION

The present invention decomposes a first matrix to its columns and a second matrix to its rows, and performs matrix multiplication of respective columns and rows. Vector multiply is used as the first step for first column of said first matrix and said first row of second matrix, and vector multiply-accumulate operation is used for the rest of the respective columns and rows. In each step, elements of column of first matrix and elements of row of second matrix is mapped according to matrix multiplication requirements.

Figure 1:
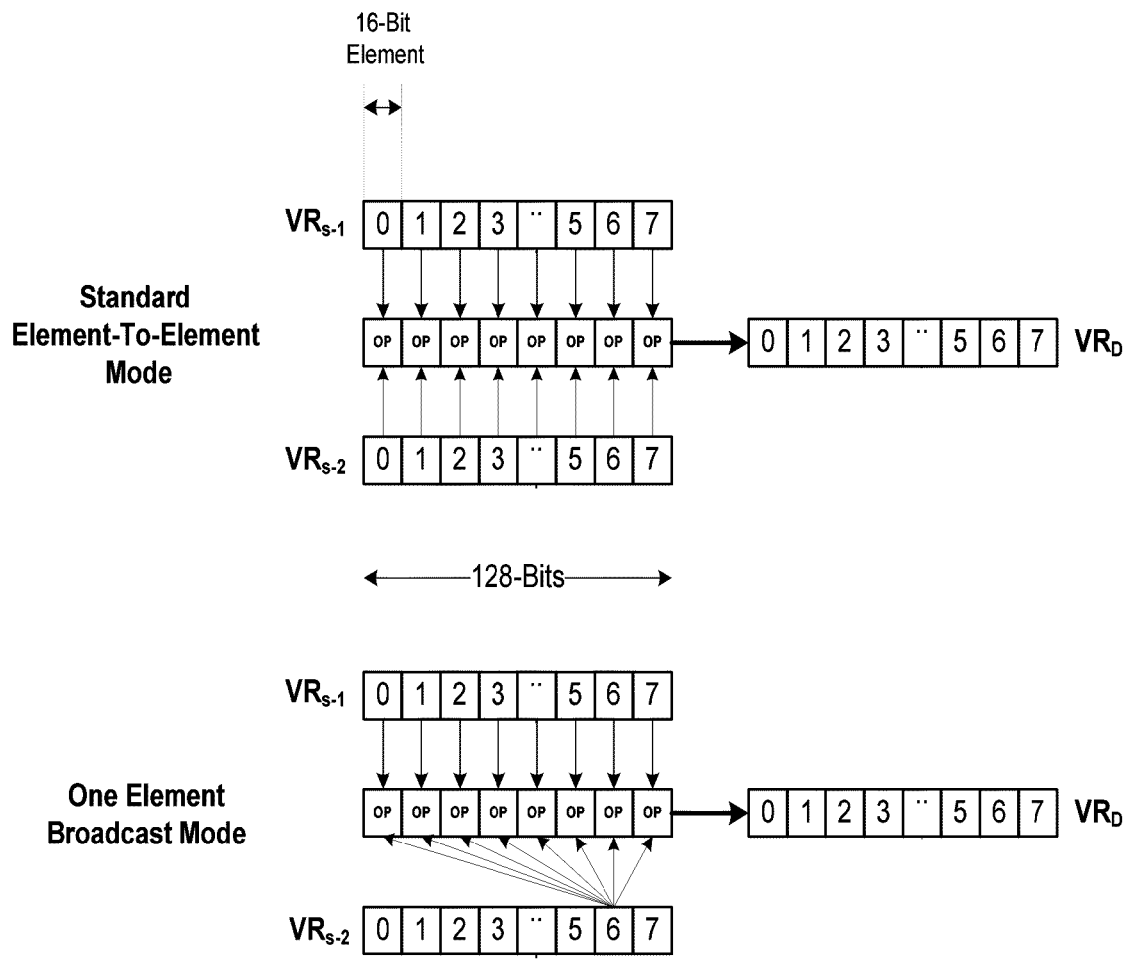
FIG. 1 illustrates an example of one-to-one and broadcast modes of vector operations, that is, operations between vector elements as implemented by a prior art SIMD processor. Both, one-to-one operations between corresponding vector elements of the source vector registers, and, operations where one element of a source vector register is broadcast to operate in combination across all the elements of the other source vector register, are illustrated in this figure.
Figure 2:
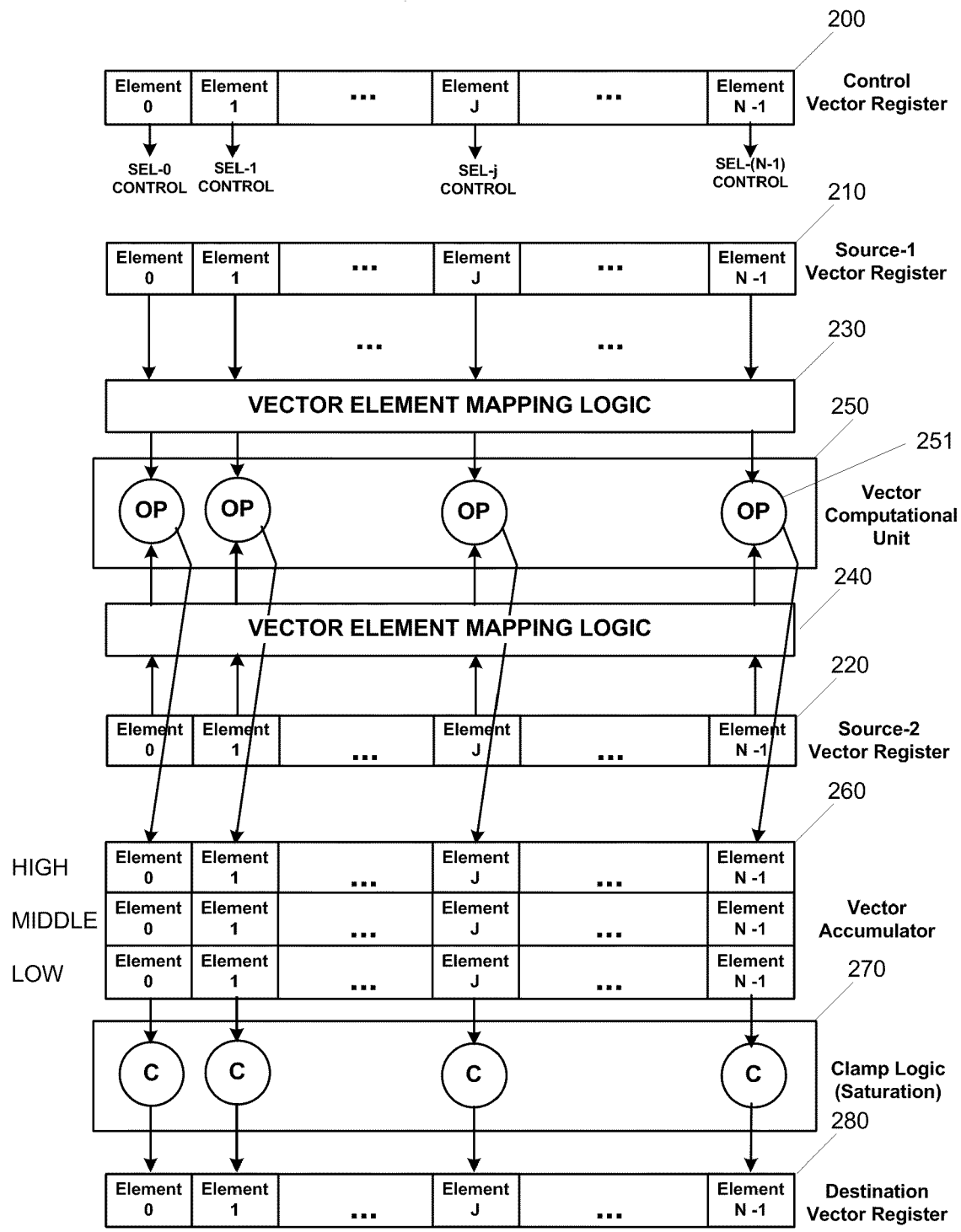
FIG. 2 shows the method of present invention, where the mapping of elements of both source vectors is flexible. Paired inputs to vector computational unit from two source inputs of source-1 vector register and source-2 vector register are mapped from any element of each of the two source vector elements.
Figure 3:
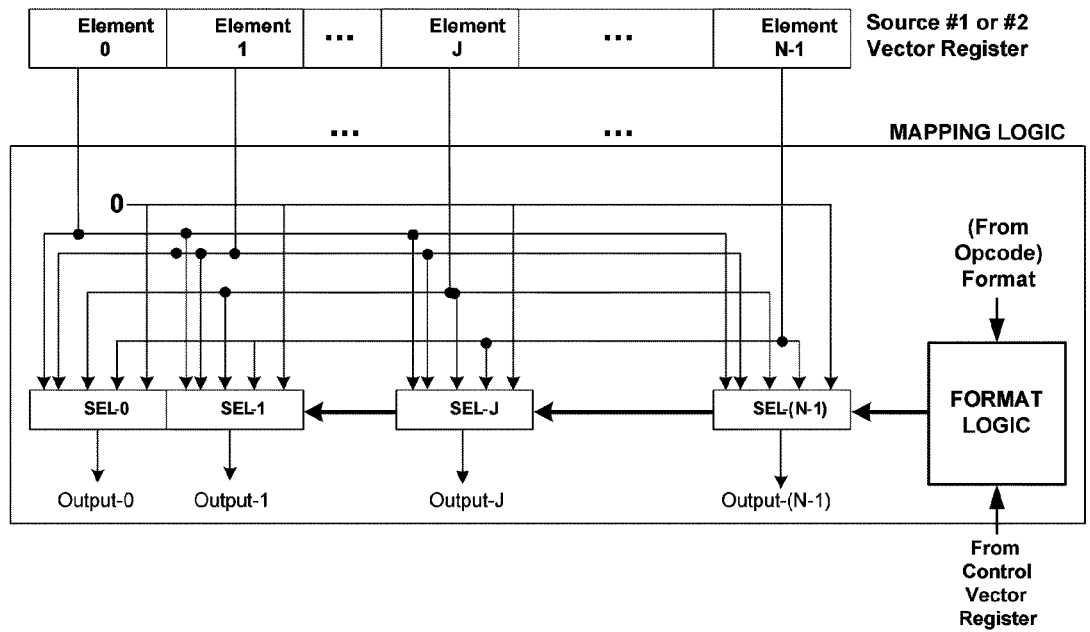
FIG. 3 illustrates the details of vector mapping logic block that is used twice in FIG. 2. Multiplexers are used to select one of the source vector elements based on a control field for each of the vector elements provided in a specified vector control register. Zero value could be sourced for any source vector element.

The present invention uses a control vector register to control the mapping of one or both source vector elements on a per-element basis, as shown in FIG. 2. For each element position of the output vector, different bit-fields of the corresponding element of control vector register 200 provides mapping for a given vector instruction. There are two-vector mapping logic blocks, one for each of the two source vectors. The mapping logic 230 maps elements of source-1 vector register 210, and the mapping logic of 240 maps elements of source-2 vector register 220. Thus, units 230 and 240 constitute a means for mapping of a first and second source vector elements. The outputs of mapping logic 230 and 240 constitute paired source vector elements as inputs to each of plurality of computational blocks of vector computational unit 250. Each computational unit (shown as "OP", or OPeration) 251 can perform arithmetic or logical operations on said paired source vector elements. The output of vector computational unit is stored or added to respective elements of vector accumulator 260, in accordance with a given vector operation. The contents of vector accumulator elements are clamped by clamp logic 270 and stored into selected destination vector register 280 in one embodiment. As we have seen in the above examples, efficient multiplication of matrices requires mapping of both source vectors. Each vector element mapping logic consists of multiple select logic, as shown in FIG. 3. An option to override a zero value is also provided for other vector operations of the preferred embodiment of present invention, but is not really needed for matrix operations. Each select unit, SEL-0 through SEL-(N−1) can select any one of the elements of a source vector. One of three operating modes is selected by the format logic that controls these select logic units to map elements of source vectors to be paired in accordance with a instruction format defined by a vector instruction and also control vector register element values. Table of FIG. 3 shows three different instruction formats: prior art respective elements of two source vectors and one element to be broadcast to all element positions (both shown in FIG. 1), and the general mapping of any-element of first source vector to be paired with any-element of second source vector. The opcode coding of a vector instruction determines which of the instruction formats is chosen.

The preferred embodiment maps the fields of each control vector element as follows to control the select logic for each vector element:

Bits 5-0: Select source element from VRs-1 vector register;
Bit 6: When set to one, selects zero for VRs-1
Bit 7: Reserved.
Bits 13-8: Select source element from VRs-2 vector register;
Bit 14: When set to one, selects zero for VRs-2
Bit 15: Mask bit, when set to one disables writing output for that element.

Figure 4:
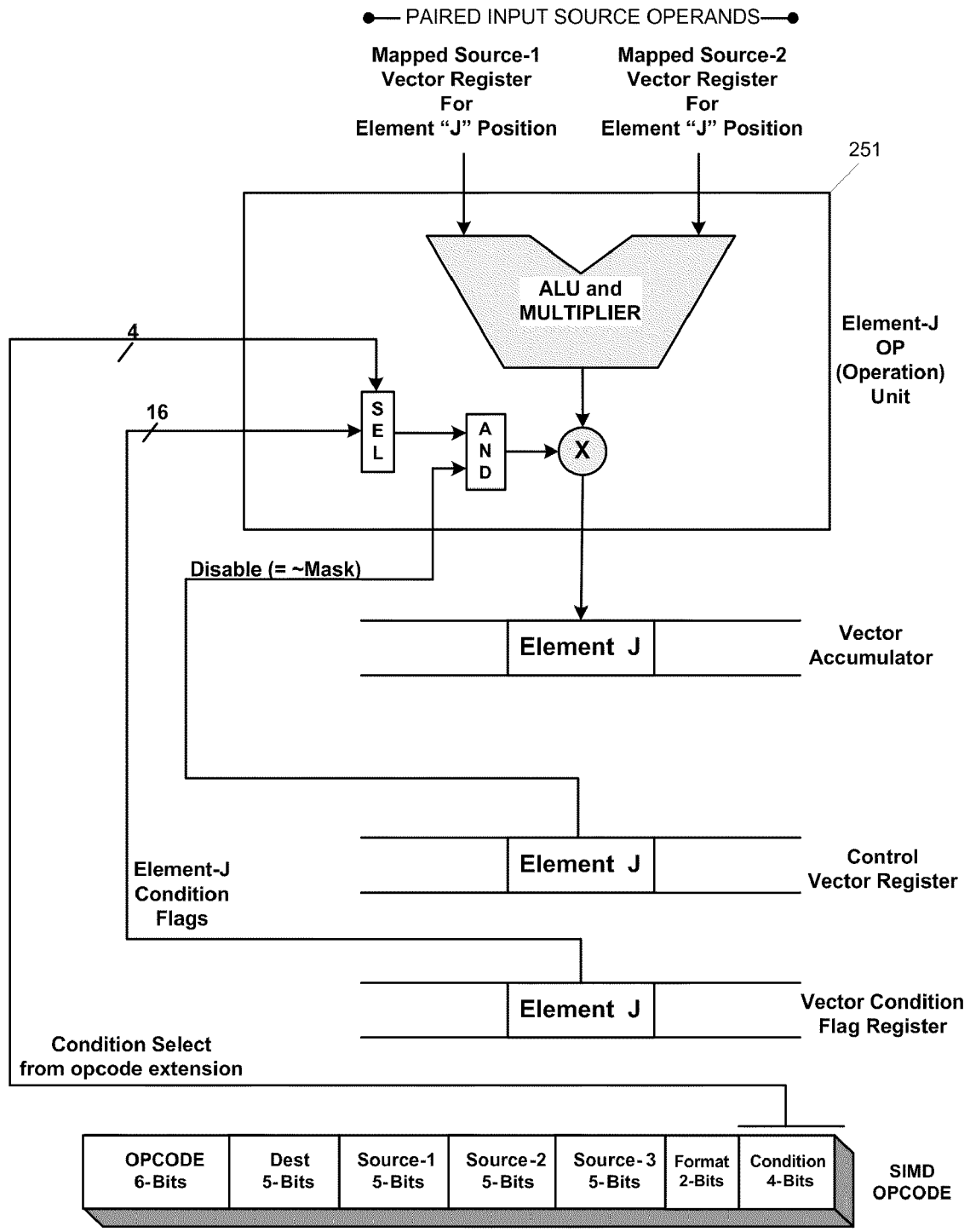
FIG. 4 illustrates per-vector-element Condition flag and Mask Control of SIMD Operations, that is, the operation of enable/disable bit control and condition code control of vector operations. The condition flags and mask control are not used for the matrix multiplication, but is, in general, part of the preferred embodiment of present invention for other SIMD operations.

This mapping supports up to 64 vector elements, i.e., 64-wide SIMD. If there are fewer elements, then the unused bits could be reserved as zero for possible future extension. FIG. 4 shows the operation of condition codes and mask bit. The paired elements of two source vectors are used as inputs of element-J operation unit, which shows further details of OP unit 251 from FIG. 2. The condition flag select bits are selected as part of an Opcode condition field The mask bit for a given vector element position is also provided from control vector register respective element field. The selector chooses one or combination of condition flags for each element position. The result of the condition flag selector is a binary true or false, which is logically AND'ed with the inverted mask (disable) bit. If the result of this is logical zero, then the write-back for that element position is disabled, which leaves the output element for that element position unchanged. Mask bit is not used for matrix multiplication. Condition flags could be used if the matrix multiplication we have is a conditional matrix multiplication, i.e., if we multiply under certain condition only. For example, we could specify matrix multiplication, if the input is YUV stream to change it to RGB, but leave it unchanged if the input stream is RGB.

In the preferred embodiment of present invention, the vector instruction has the following format:

<Vector Inst>[.CC] VRd, VRs-1, VRs-2, VRs-3

Where "CC" indicates one of condition flags selected as determined by the "Condition" field of opcode, and {VRd, VRs-1, VRs-2, VRs-3} are vector register designators. VRd represents a destination vector register, and VRs-1 and VRs-2 represent source vector registers. VRs-3 represents a selected control vector register as third source operand.

All vector registers sourced from a common pool of vector registers, or from an alternate vector register file. The advantage of using a separate vector register file is that it allows a single-ported register file to be use while expanding the number of available registers. The disadvantage of the using a separate vector file for control vector is that overall gate count is increased. Assembly syntax determines which format is used or chosen. If third source vector is specified as VRA, then it is sourced from alternate vector register file, and if it is specified as VR, it is sourced from primary vector register file.

Figure 5:
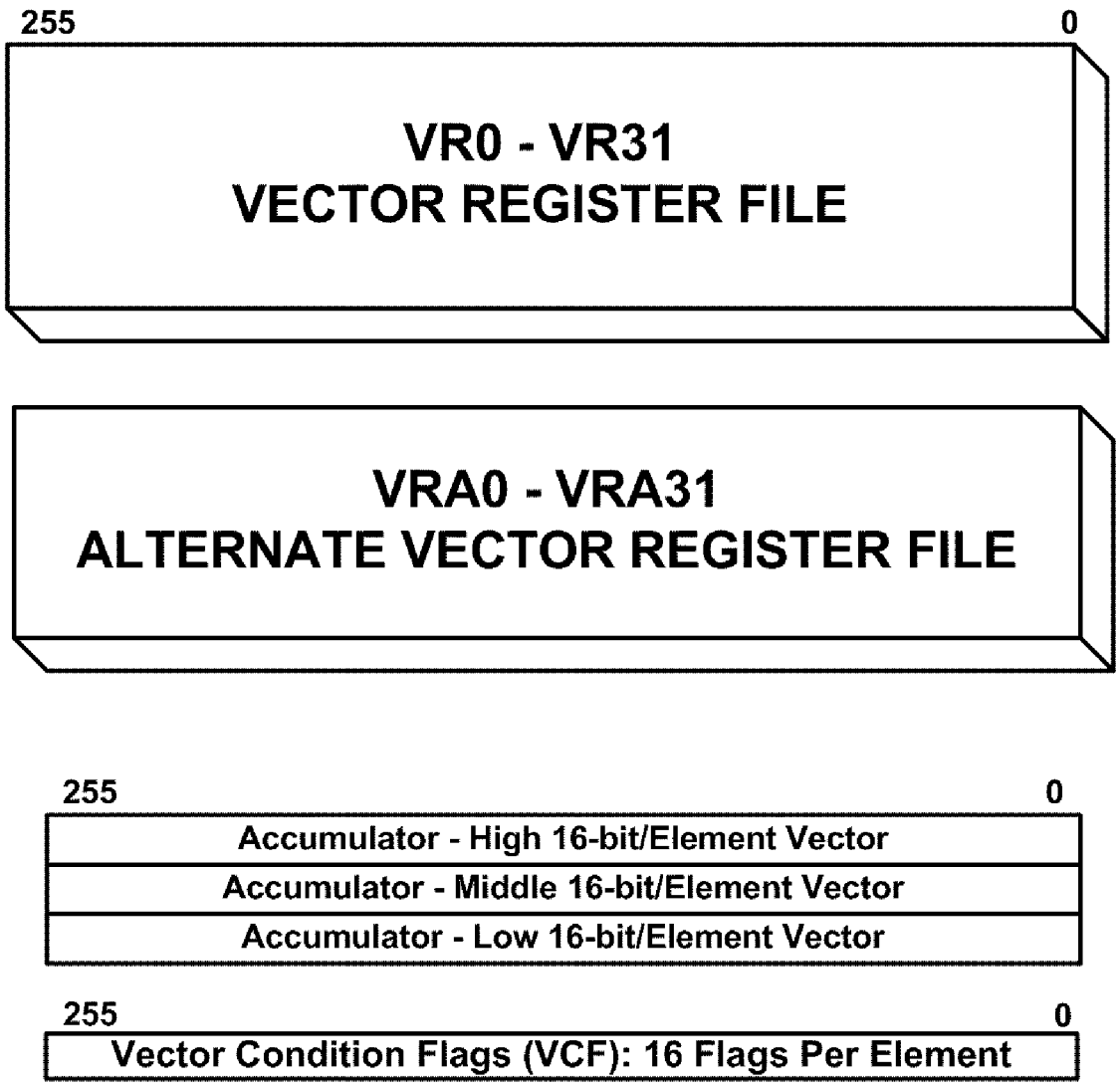
FIG. 5 shows the programming model of vector registers for the preferred embodiment.

The programming model of vector register for a preferred embodiment is shown in FIG. 5. VR0-VR31 is the primary vector register file. For the embodiment with 16 vector elements with 16-bits for each vector element, each vector register is 256-bits wide. Each vector element represents a 16-bit fixed point number. In other embodiments, each vector element can have more bits, or can be a floating-point number. VRA0-VRA31 is the alternate vector register file, which may or may not exist in different embodiments. VRA vector register could be used as control vector registers, or as second source operands, but not as destination vector registers. Vector Condition Flag (VCF) register contains 16 condition flags for each vector element in one embodiment, and for 16-wide SIMD VCF is 256-bits wide. One of the 16 condition flags for each vector element position is chosen by the condition field (Condition) of opcode.

The vector accumulator of preferred embodiment is 48-bits per vector element, but could have other bit widths also. The 48-bit vector element of vector accumulator is concatenated from the respective elements of three vector accumulator registers. These three components of vector accumulator are shown as high, middle, and low accumulator, where each of these is 256-bits wide for the 16-element embodiment. For the embodiment of 16-bits for each vector element, multiplication of two vectors will result in 32-bits per vector element, and summing these 32-bit interim values with a vector multiply-accumulate will require resolutions higher that 32-bits, which is within the 48-bit resolution. This allows accumulation of many interim results before a result is clamped and written into a destination vector register with 16-bit vector elements.

The two instructions of special interest for matrix multiplication are vector-multiply and vector-multiply-accumulate. The details of these instructions are given in FIGS. 6 and 7. The 32-bit Opcode for a preferred embodiment of SIMD processor consists of the following fields:

| | |
|---|---|
| Opcode | This is a 6-bit field that selects of the SIMD operations. This limits the maximum number of SIMD instructions to 64. |
| Dest | Specifies the destination vector register, which is part of the primary vector register file. This field selects one of the 32 primary vector registers. Not all instructions may require a destination vector register, in which case this field may be used for other purposes. |
| Source-1 | This 5-bit field selects one of the 32 vector registers from primary vector register file as one of the source operands to a SIMD operation. |
| Source-2 | This 5-bit field selects the second source operand for dual operand operations. This source operand could be read from either primary or alternate vector register file, depending upon the FORMAT field setting of Opcode. It is allowed to have both source-1 and source-2 operands to be the same. This is useful for vector or array operations within a vector or array. For example, this means we could operate on different elements of a vector as intra vector/array operations. |
| Source-3 | This 5-bit field specifies one of the vector registers from primary or alternate vector register file as the third source operand. Typically, the third source operand is used as a control vector for mapping of vector elements and other control of SIMD operations. |
| Format | This two-bit field determines the type of instruction, as given by table of FIG. 13. |
| Condition | All SIMD instructions are conditional. This 4-bit field determines which of the plurality of condition flags is to be used for each vector element for a given instruction. |

The full-mapping format of vector multiply (VMUL) instruction has the format without the use of conditional operation:

VMUL VRd, VRs-1, VRs-2, VRs-3.

VRs-3 select one of the vector register as the control vector, which defines the mapping of first and second source vectors stored in vector registers defined by operand fields VRs-1 and VRs-2, respectively. The operation of VMUL instruction using pseudo c-type code for the embodiment with N vector elements per vector register and N vector operation units per vector computational unit is shown in the operation section of FIG. 6. Even though this shows sequential operation from element 0 through N−1, in actuality, operations on all vector elements are performed in parallel. The index "i" signifies a destination or output vector element position. For each destination vector element position, depending upon the format field, the type of mapping is chosen. For the full-mapping mode, bit fields of [5:0] of VRs-3 specifies the vector element number of first source vector that is mapped to that position. Similarly, bit fields of [13:8] of VRs-3 specifies the vector element number of second source vector that is mapped to that position. If bit number 6 is 1, then mapped first source vector element is treated as zero, and similarly, if bit number 14 is zero, then mapped second source vector element is treated as zero. The paired source vector elements are multiplied and stored into vector element position "i" of vector accumulator if the mask bit is zero and if the condition flag selected is true. Since all vector instructions of preferred embodiment is conditional, leaving out condition codes defaults to selection of hard-wired always-true condition (one bit of VCF is hardwired to 1 for each element). The mask bit is set to value of bit #15 of VRs-3 for position "i" for full mapping mode, and to zero for other instruction formats. The subscript values in FIG. 6 refer to the bit-field values that are used. The symbol "~" indicates inversion. The multiplication of two 16-bit numbers per vector element of one embodiment results in 32-bit values to be stored in each element of accumulator. If mask value is one for a given vector element position or if the selected condition defined by "Condition" field of opcode of VCF register for the corresponding element is interpreted as false, neither the respective number vector accumulator element nor the respective destination vector register element is affected, and both remain unchanged. This is indicated by ~Mask && VCF[i][Condition] in the operation of VMUL and VMAC instructions, where "&&" indicates a logical AND operation for testing. This means that mask bit has to be zero (~ indicates bit inversion) and condition flag of VCF selected by vector element number "i" and Condition field of opcode (CC in assembly syntax), which selects one of the condition flags for a given vector element of VCF, has to be true for both respective elements of vector accumulator and respective element of vector destination register to be updated. VMAC instruction shown in FIG. 7 is very similar, except the output of vector multiply is added to the respective element of the vector accumulator.

Both VMUL and VMAC and other vector instructions support three different instruction formats (as shown in FIGS. 6 and 7 under Format section):

| | |
|---|---|
| VMAC [.CC] | VRd, VRs-1, VRs-2 |
| VMAC [.CC] | VRd, VRs-1, VRs-2 [element] |
| VMAC [.CC] | VRd, VRs-1, VRs-2, VRs-3 |

The first of these refer to prior art mode of vector operations on respective vector elements (see FIG. 1, standard element-to-element mode). This is the default mode, if no third source vector operand is specified. The second one refers to one-element broadcast form (see FIG. 1, one element broadcast mode). In this mode, the field of third source operand in opcode is used to code the element number of second source vector to be mapped to all element positions for pairing. Due to opcode mapping, preferred embodiment allows broadcast of only elements of second source vector. But, due to symmetry this is not a limitation (source-1 could be interchanged with source-2). The third format specifies any-element of first source vector to be paired with any element of second source vector. This is the format used for efficient implementation of matrix multiplication.

For the embodiment, where each vector element of vector register is 16-bits, and vector accumulator elements are 48-bits each, it is necessary to perform clamping to transfer results from vector accumulator to the destination vector register. Assuming the numbers have two's complement signed format, the maximum and minimum numbers possible are 0x7FFF and 0x8000, where the preamble of "0x" represents hexadecimal notation. Clamping operation is shown as "Signed-Clamp" in FIGS. 6 and 7, where if the value of accumulator is more than 0x7FFF in hexadecimal, then it is clamped to 0x7FFF. This is referred to as using saturated arithmetic. Similarly, if the result is less than 0x8000, then it is clamped to 0x8000.

The details of both VMUL and VMAC show multiplication of paired elements of first and second source as (Paired_Source_1*Paired Source_2])$_{31..0}$ where the subscripts of 31..0 signify that the result of two 16-bit operands is 32-bits, and that is moved to the accumulator or summed with accumulator.

Both VMUL and VMAC instructions execute at a pipelined rate of one clock cycle per instruction. The execution of VMUL and VMAC includes mapping of both source operands, multiplication, accumulation if VMAC, and signed clamping and storing into vector destination register.

Figure 15:
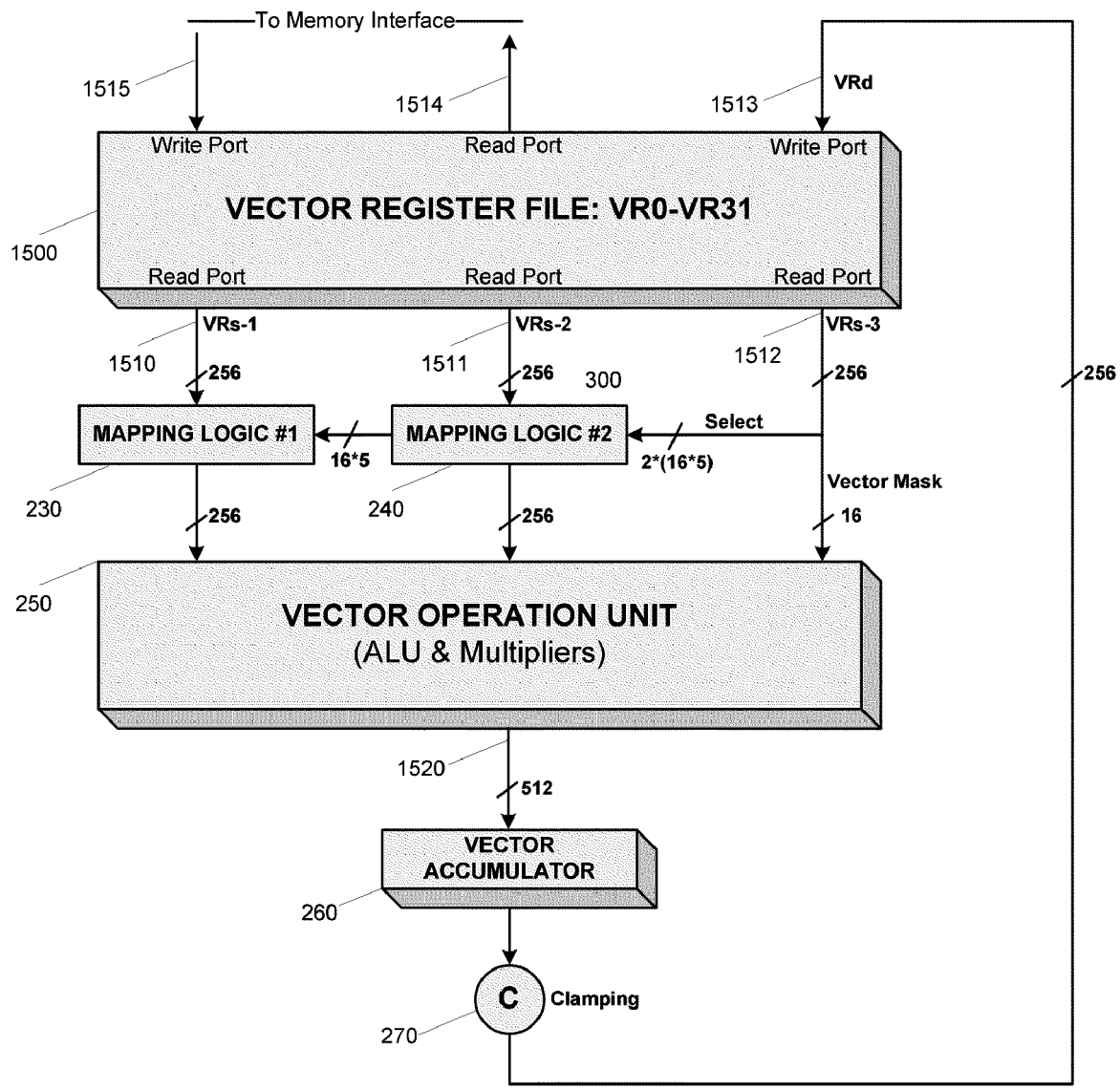
FIG. 15 shows a high-level view of embodiment shown in FIG. 2 with a vector accumulator, where all source and destination vector registers are stored in a vector register file with multiple ports.

FIG. 15 shows high-level view of embodiment given in FIG. 2 with using a primary vector register file to store all source and destination vector operands. The opcode format given in FIGS. 4, 6, and 7, shows only 5-bit field for source and destination operands. This means one embodiment of present invention is using vector register to vector register model architecture, where all operands have to be in vector registers (as opposed to a location in main memory). The vector register file 1500 have three read ports that correspond to reading first source operand 1510, reading second source operand 1511, and reading third source operand 1512. 5-bit fields, VRs-1, VRs-2, VRs-3, from opcode select one of the vector register VR0-VR31 for each of these read ports. Control vector is read from VRs-3 port 1512, which consists of 5-bit field for mapping first source operand, 5-bit field for mapping second source operand, and a mask bit value for each vector element position. The output of vector operation unit 250 has potentially output of 512 bits for the case of vector multiplication. Write port 1513 is used to write destination vector selected by opcode field VRd.

The two additional ports, read port 1514 and write port 1515 are used for transferring vector register values between vector register file 1500 and main memory (not shown here). In one embodiment such transfer operations are performed concurrently with vector operation of source vectors of vector register file. In another embodiment, special load and store instructions could be used without concurrency with vector operations, and in this case the ports of 1514 and 1515 could be shared with other read and write ports.

Figure 14:
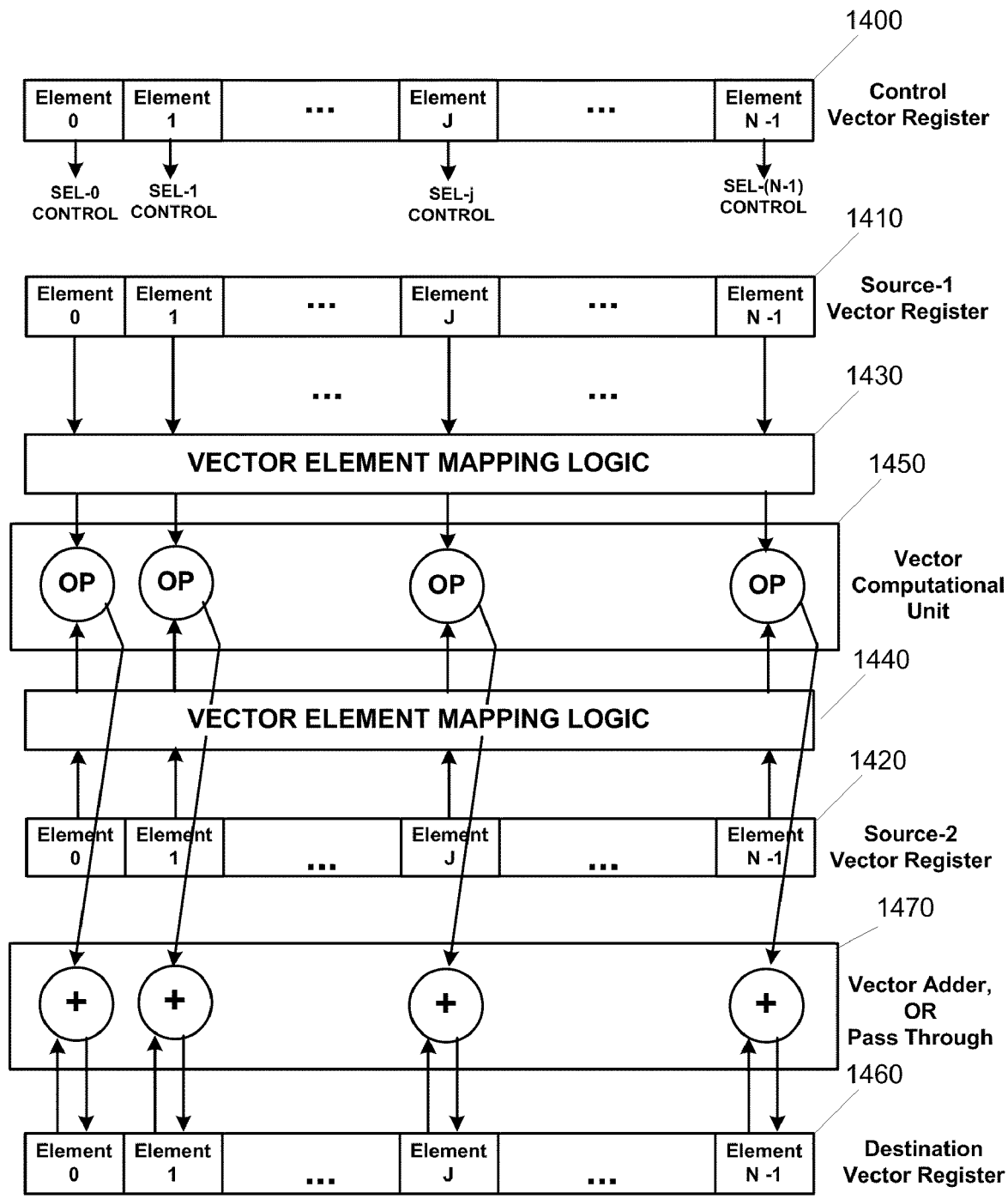
FIG. 14 shows another embodiment of present invention without a separate vector accumulator, where destination vector register also acts as the vector accumulator.

Another embodiment of present invention does not require a separate vector accumulator. If each vector element has enough resolution to store interim resolution of multiplied and accumulated vector values, then a selected vector destination register could also act as the vector accumulator. Such a case is when each vector element is, for example, capable of storing a 40-bit or larger number or a floating-point number of sufficient resolution. In this case, no separate vector accumulator is needed, as shown in FIG. 14. Also, no clamping logic is required for use of saturated arithmetic before contents of vector accumulator is transferred to selected vector destination register. The vector adder 1470 in this case either passes through the results for the case of vector-multiply, or adds the results of vector multiply to respective elements of destination vector register for the case of vector multiply-accumulate operation.

A processor typically has many stages of pipeline operation. The preferred pipelining of present invention has the following five stages of pipeline for each SIMD instruction:

1. Instruction Fetch (IF);
2. Instruction Decode and Register Decode (ID/RD);
3. Execute-1: Contains vector arithmetic or logical operations;
4. Execute-2: Stage where intermediate results are stored into vector accumulator;
5. Write-Back (WB): Stage where signed-clamped and saturated vector accumulator values are stored back into the vector register file.

Multiplexing of both source elements are done as part of the ID/RD stage. Alternatively, we could add another stage for the mapping operation for increased pipeline clock rate.

Implementation of H.264 DCT Operation

Let us assume we have a 16-wide embodiment of SIMD processor. Then it would take four SIMD arithmetic instructions as shown below to implement the multiplication of two 4×4 matrices. In this case, multiplying a column vector of 4 elements with a corresponding row vector of 4 values generate 16 values in a 4-by-4 matrix (refer back to FIG. 11, 1180). But, since SIMD has 16 vector arithmetic units, we could calculate partial products for all 16 output element positions in parallel. If this were not the case, such as with a 8-wide SIMD, we would have to divide the output matrix into 4-by-2 or 2-by-4 matrices and use a different mapping of for each step.

The mapping for operation on each decomposed column changes because we assumed all elements of both matrices are preloaded in one step and only once, thereby requiring a different mapping for each step of decomposition (instead of loading new values for each column and row at each step). Since four mapping vectors could be preloaded in four different vector register and can remain unchanged, this is more optimal. Assuming one vector load instruction to load first matrix into vector register VR1, and one vector load instruction to load second matrix into VR2, DCT operation would require a total of eight SIMD arithmetic instructions (vector load instructions not shown here).

| | |
|---|---|
| VMUL | VR0, VR1, VR2, VR3; |
| VMAC | VR0, VR1, VR2, VR4; |
| VMAC | VR0, VR1, VR2, VR5; |
| VMAC | VR0, VR1, VR2, VR6; |

Where VR1 contains all the 16 values of first 4×4 matrix, and VR2 contains all the values of second 4×4 matrix. The last instruction adds the last partial product to the vector accumulator, and then clamps the accumulator values to 16-bits and stores in VR0. Loading a vector register requires a single vector load instruction. We have not shown the loading of VR1, VR2 and the VRA0-3 here. We assume VR3-6 are preloaded with the mapping values as follows:

| | |
|---|---|
| VR3 = | {0, 0, 0, 0, 4, 4, 4, 4, 8, 8, 8, 8, 12, 12, 12, 12} + {0, 1, 2, 3, 0, 1, 2, 3, 0, 1, 2, 3, 0, 1, 2, 3} << 8; |
| VR4 = | {1, 1, 1, 1, 5, 5, 5, 5, 9, 9, 9, 9, 13, 13, 13, 13} + {4, 5, 6, 7, 4, 5, 6, 7, 4, 5, 6, 7, 4, 5, 6, 7} << 8; |
| VR5 = | {2, 2, 2, 2, 6, 6, 6, 6, 10, 10, 10, 10, 14, 14, 14, 14} + {8, 9, 10, 11, 8, 9, 10, 11, 8, 9, 10, 11, 8, 9, 10, 11} << 8; |
| VR6 = | {3, 3, 3, 3, 7, 7, 7, 7, 11, 11, 11, 11, 15, 15, 15, 15} + {12, 13, 14, 15, 12, 13, 14, 15, 12, 13, 14, 15, 12, 13, 14, 15} << 8; |

It is important to note that each step of mapping involves mapping only four values (a column or row vector) into 16 output matrix positions. We used a shifted sum of two vector values for the purpose of readability that is calculated at assembly time ("<<" denotes shifting left by number of bits following it). The mapping values were derived from Table of FIG. 11 assuming row-sequential ordering of both matrices in memory.

The outputs of the first three vector instructions in VR0 is not important, as they are only partial results, and vector accumulator has the full resolution interim value. Only at the last step that final vector accumulator value clamped and stored into VR0, which carries final result, and at this point vector accumulator values could be discarded or overwritten in subsequent vector operations.

I claim:

1. A method for performing matrix multiplication of a first matrix and a second matrix in parallel, comprising:
    a) providing a vector register array with the ability to store a plurality of vectors, wherein each of said plurality of vectors contains N vector elements, said plurality of vectors includes a first source vector, a second source vector, and a control vector;
    b) storing elements of a column of said first matrix into said first source vector;
    c) storing elements of a respective row of said second matrix into said second source vector, wherein said respective row is equal-numbered as said column;
    d) storing mapping information of said first source vector and said second source vector into said control vector;
    e) mapping elements of said first source vector;
    f) mapping elements of said second source vector;
    g) performing a vector multiplication of respective elements of said mapped first source vector and said mapped second source vector;
    h) performing a vector addition of results of said vector multiplication to a vector accumulator;
    i) repeating steps of b through h for all column vectors of said first matrix; and
    wherein steps of e through g are performed by a vector multiply instruction in a single pipelined clock cycle.

2. The method of claim 1, wherein a predetermined mapping in accordance with matrix multiplication requirements is used for each iteration of steps b through h.

3. The method of claim 1, wherein designated bits of each element of said control vector determines mapping to be performed for said column and said respective row, said control vector is an operand of said vector multiply-accumulate instruction.

4. The method of claim 1, wherein said vector accumulator is cleared before accumulation of a first partial result.

5. The method of claim 1, wherein steps g and h are combined and performed by a vector multiply-accumulate operation, said vector multiply-accumulate operation is performed in one pipelined clock cycle.

6. The method of claim 1, wherein size of said first matrix is M-by-L, size of said second matrix is L-by-P, each of said first source vector and said second source vector has N elements, and N multiply or multiply-accumulate operations are performed at each step of vector arithmetic operation.

7. The method of claim 6, wherein matrix multiplication is performed using L operations of vector multiply or vector multiply-accumulate if N equals to M*P.

8. The method of claim 6, wherein subset of output matrix elements are calculated if N is less than M*P, and steps of claim 18 are repeated for remainder of said output matrix elements.

9. The method of claim 6, wherein two or more matrix multiplication operations are performed in parallel if N equals to or is greater than 2*M*P.

10. The method of claim 1, wherein values stored in elements of said vector accumulator is clamped to a range of numbers represented by the number of bits of a destination vector and stored into said destination vector.

11. The method of claim 7, wherein all column vectors of said first matrix is loaded in said first source vector and used as source for mapping elements of column vectors.

12. The method of claim 7, wherein all row vectors of said second matrix is loaded in a fourth said second source vector and used as source for mapping elements of row vectors.

13. An execution unit for performing matrix multiplication of a first matrix with a second matrix using a plurality of computational units in parallel, the execution unit comprising:
- a vector register file with multiple ports including a plurality of vector registers wherein each of said plurality of vector registers storing N vector elements, and said vector register file containing a first source vector as a first operand, a second source vector as a second operand, and a control vector register as a third operand of a vector instruction;
- means for mapping elements of said first source vector and said second source vector in accordance with said control vector register, said first source vector elements comprising a numbered column of said first matrix, and said second source vector elements comprising a respective numbered row of said second matrix;
- a vector computational unit, comprising said plurality of computational units, wherein mapped elements of source vectors provide paired vector elements as inputs to each of said plurality of computational units;
- a vector accumulator, wherein output of said vector computational unit is stored or accumulated with previous partial results;
- wherein at least one vector multiply instruction is executed for performing matrix multiplication of first column of said first matrix with first row of said second matrix with a single clock cycle throughput; and
- wherein a plurality of vector multiply-accumulate instructions are executed for performing matrix multiplication of second and subsequent columns of said first matrix with respective second and subsequent rows of said second matrix and accumulation of partial results by said vector accumulator, each of said plurality of vector multiply-accumulate instructions is executed with single clock cycle throughput.

14. The execution unit of claim 13, wherein designated bits of said control vector register for each vector element position determines mapping elements of said first source vector and said second source vector.

15. The execution unit of claim 13, wherein a designated bit of said control vector register for each vector element position determines if respective vector element of said vector accumulator is updated by the output of respective unit of said plurality of computational units.

16. The execution unit of claim 13, wherein said vector accumulator uses at least 2*J+Log 2(L) bits of resolution for each vector element to maintain computational accuracy during a plurality of sequential vector multiply and vector multiply-accumulate operations, where J is the number of bits of each source vector element.

17. The execution unit of claim 13, further including a saturation logic for clamping inputs coupled from said vector accumulator elements to J bits, where J is the number of bits of elements of a destination vector register, wherein the output of said saturation logic is stored in said destination vector register.

18. The execution unit of claim 13, wherein three different vector instruction formats are supported in pairing elements of said first source vector and said second source vector operands: respective element-to-element format as default, one element of said second source vector broadcast across all elements of said first source vector format, and any-element of said first source vector paired with any-element of said second source vector.

19. A method for performing matrix multiplication of a first matrix with a second matrix calculating multiple values of an output matrix in parallel, the method comprising:
- a) performing matrix multiplication of first column of said first matrix with first row of said second matrix in a first set of steps performed by using a vector multiply instruction in a single clock cycle, said first set of steps comprising:
  - storing at least first column of said first matrix in a first source vector, and storing at least first row of said second matrix in a second source vector;
  - pairing elements of said first source vector and said second source vector as source value pairs for vector operations, wherein said first source vector and said second source vector are mapped in accordance with matrix multiplication requirement; and
  - performing a vector multiply operation of said paired elements of said first source vector and said second source vector, and storing output of said vector multiply operation in an output vector;
- b) performing matrix multiplication of second column of said first matrix with second row of said second matrix in a second set of steps performed by using a vector multiply-accumulate instruction in a single clock cycle, said second set of steps comprising:
  - storing at least second column of said first matrix in said first source vector, and storing at least second row of said second matrix in said second source vector;
  - repeating the step of pairing elements;
  - performing a vector multiply-accumulate operation by way of multiplying said paired elements of said first source vector and said second source vector, summing output of said vector multiply-accumulate operation with respective elements of said output vector, and storing output of summing in said output vector; and
- c) repeating said second set of steps for the rest of the columns of said first matrix and the rest of the rows of said second matrix.

20. The method of claim 19, wherein said output vector is a vector accumulator comprised of plurality of vector elements of sufficient number of bits for storing results so that adequate accuracy is maintained during a sequence of said vector multiply operation and plurality of said vector multiply-accumulate operations.

21. The method of claim 20, further comprising:
- clamping output of said vector accumulator to maximum and minimum values when elements of said vector accumulator exceed maximum and minimum values for resolution of a destination vector, respectively; and
- storing clamped output of said vector accumulator to said destination vector.

22. The method of claim 19, wherein mapping of said first source vector and said second vector for pairing of elements as source value pairs is defined by designated bits of elements of a control vector.

23. The method of claim 22, wherein said control vector is used as an operand as part of a vector multiply instruction and a vector multiply-accumulate instruction to define mapping of said first source vector and said second source vector.

24. The method of claim 23, further comprising a mask bit for each vector element of said control vector to determine whether the output value for said vector multiply operation and said vector multiply-accumulate operation for a given vector element position is written to respective elements of said output vector.

25. The method of claim 19, wherein calculating as many of said output matrix values in parallel as determined by the number of available vector elements and number of multiply operations that is supported to be performed in parallel.

26. The method of claim 19, wherein the multiple steps of storing columns in said first source vector is reduced to a single step, if number of vector elements of said first source vector is equal or greater than all elements of said first matrix.

27. The method of claim 19, wherein the multiple steps of storing rows in said second source vector is reduced to a single step, if number of vector elements of said second source vector is equal or greater than all elements of said second matrix.

28. The method of claim 19, wherein all values of said output matrix are calculated in parallel if the number of vector elements of said first source vector and number of multiply operations that is supported to be performed in parallel are both equal to or greater than the number of elements of said output matrix.

29. The method of claim 23, wherein said output matrix is calculated using one of said vector multiply instruction and three of said vector multiply-accumulate instructions if said first matrix size is 4×4, said second matrix size is 4×4, if there are 16 vector elements in said first source vector and said second source vector, and 16 multiply or multiply-accumulate operations are performed by said vector multiply instruction or said vector multiply-accumulate instruction, respectively.

* * * * *